US008545277B2

(12) United States Patent
Ondusko et al.

(10) Patent No.: US 8,545,277 B2
(45) Date of Patent: Oct. 1, 2013

(54) TERMINAL BLOCK

(75) Inventors: Russell Ondusko, Voorhees, NJ (US); Courtney Walsh, Wilmington, NC (US)

(73) Assignee: OMEGA Engineering, Inc., Stamford, CT (US)

( * ) Notice: Subject to any disclaimer, the term of this patent is extended or adjusted under 35 U.S.C. 154(b) by 0 days.

(21) Appl. No.: 13/136,227

(22) Filed: Jul. 26, 2011

(65) Prior Publication Data
US 2012/0071038 A1    Mar. 22, 2012

Related U.S. Application Data

(60) Provisional application No. 61/367,580, filed on Jul. 26, 2010.

(51) Int. Cl.
*H01R 13/02*    (2006.01)
(52) U.S. Cl.
USPC .......................................... 439/884; 439/441
(58) Field of Classification Search
USPC ................ 439/441, 721, 729, 883, 884, 828, 439/829, 834, 835
See application file for complete search history.

(56) References Cited

U.S. PATENT DOCUMENTS

| | | | |
|---|---|---|---|
| 4,405,188 A * | 9/1983 | Schwartz | 439/70 |
| 4,472,015 A * | 9/1984 | Nicholson et al. | 439/651 |
| 6,074,089 A | 6/2000 | Hollander et al. | |
| 6,270,384 B2 * | 8/2001 | Jaag | 439/835 |
| 6,875,062 B2 * | 4/2005 | Bouley et al. | 439/834 |
| 7,029,336 B2 * | 4/2006 | Cox | 439/709 |
| 7,084,342 B2 | 8/2006 | Schuh | |
| 7,115,001 B1 | 10/2006 | Brockman et al. | |
| 7,909,633 B1 * | 3/2011 | Miller et al. | 439/441 |
| 2004/0095108 A1 | 5/2004 | Kernahan et al. | |
| 2006/0067377 A1 | 3/2006 | Streicher | |
| 2007/0173136 A1 * | 7/2007 | Bentler et al. | 439/835 |
| 2008/0272090 A1 | 11/2008 | Keihle et al. | |
| 2009/0111334 A1 * | 4/2009 | Diekmann | 439/721 |
| 2009/0156066 A1 * | 6/2009 | Huang et al. | 439/884 |
| 2012/0071038 A1 * | 3/2012 | Ondusko et al. | 439/884 |
| 2012/0094552 A1 * | 4/2012 | Reibke et al. | 439/884 |

FOREIGN PATENT DOCUMENTS

EP    2204886 B1    4/2011

OTHER PUBLICATIONS

International Search Report and Written Opinion for PCT/US2011/01319 dated Dec. 7, 2011.

* cited by examiner

*Primary Examiner* — James Harvey
(74) *Attorney, Agent, or Firm* — MGK, LLC

(57) ABSTRACT

A terminal block includes a first end, a second end, a top surface and a bottom surface. A first connection socket is disposed on the top surface in proximity to the first end of the terminal block. A second connection socket is disposed on the top surface in proximity to the second end of the terminal block. A thermocouple connector is disposed on the top surface and is coupled to the first connection socket and the second connection socket. In one embodiment, the thermocouple connector is a miniature type SMP thermocouple connector. In one embodiment, a system of interconnected components employs the terminal blocks at a plurality of control points. A meter is selectively coupled to the terminal blocks for measuring, sensing and collecting at least one of data and information at the plurality of control points.

20 Claims, 6 Drawing Sheets

TERMINAL BLOCK

CROSS-REFERENCE TO RELATED APPLICATIONS

This patent application claims priority benefit under 35 U.S.C. §119(e) of U.S. Provisional Patent Application, Ser. No. 61/367,580, filed Jul. 26, 2010, the disclosure of this U.S. patent application is incorporated by reference herein in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the United States Patent and Trademark Office files or records, but otherwise reserves all copyright rights whatsoever.

BACKGROUND

1. Field of the Invention

The present invention relates generally to devices for sensing, measuring and/or collecting data and information on components within a system and/or conditions, parameters and the like, of the system or process monitored or controlled by the system. In particular, the present invention relates to improved connectors and interfaces used to couple the devices to components within the system for monitoring, testing and/or controlling the components and/or the process.

2. Description of Related Art

Generally speaking, a terminal block provides a facility for coupling individual electrical wires and/or leads of electronic components. For example, wires and leads of various items of equipment are connected to sockets of a terminal block to make electrical, signal, and/or data connections between components. Terminal block also permit the sensing, measuring and/or collecting of data and information related to the equipment or the process employing the equipment. As can be appreciated, it is desirable to ensure that accurate readings are taken at the terminal block and/or that multiple connection types and points are supported by the terminal block to provide flexibility in sensing, measuring and/or collecting activities.

SUMMARY OF THE INVENTION

According to some embodiments, a terminal block includes a first end, a second end, a top surface and a bottom surface. A first connection socket is disposed on the top surface in proximity to the first end of the terminal block. A second connection socket is disposed on the top surface in proximity to the second end of the terminal block. A thermocouple connector is disposed on the top surface and is coupled to the first connection socket and the second connection socket. In one embodiment, the thermocouple connector is a miniature type SMP thermocouple connector.

In one embodiment, a system of interconnected components is presented. The system includes one or more first terminal blocks. Each of the first terminal blocks has a first end, a second end, a top surface and a bottom surface. A first connection socket is disposed on the top surface in proximity to the first end. A second connection socket is disposed on the top surface in proximity to the second end. A thermocouple connector is disposed on the top surface and is coupled to the first connection socket and the second connection socket. The system also includes a rail defining a plurality of control points of the system. The one or more first terminal blocks are selectively coupled to the rail on at least one of the plurality of control points. A plurality of second terminal blocks, distinct from the first terminal blocks, are coupled to one of the plurality of control points of the rail. A plurality of components is coupled to the second terminal blocks for electrical, signal and data communicating between the components. A meter is selectively coupled to the first terminal blocks. The meter measures, senses and collects at least one of data and information at the plurality of control points.

BRIEF DESCRIPTION OF PREFERRED EMBODIMENTS

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

Figure 1:
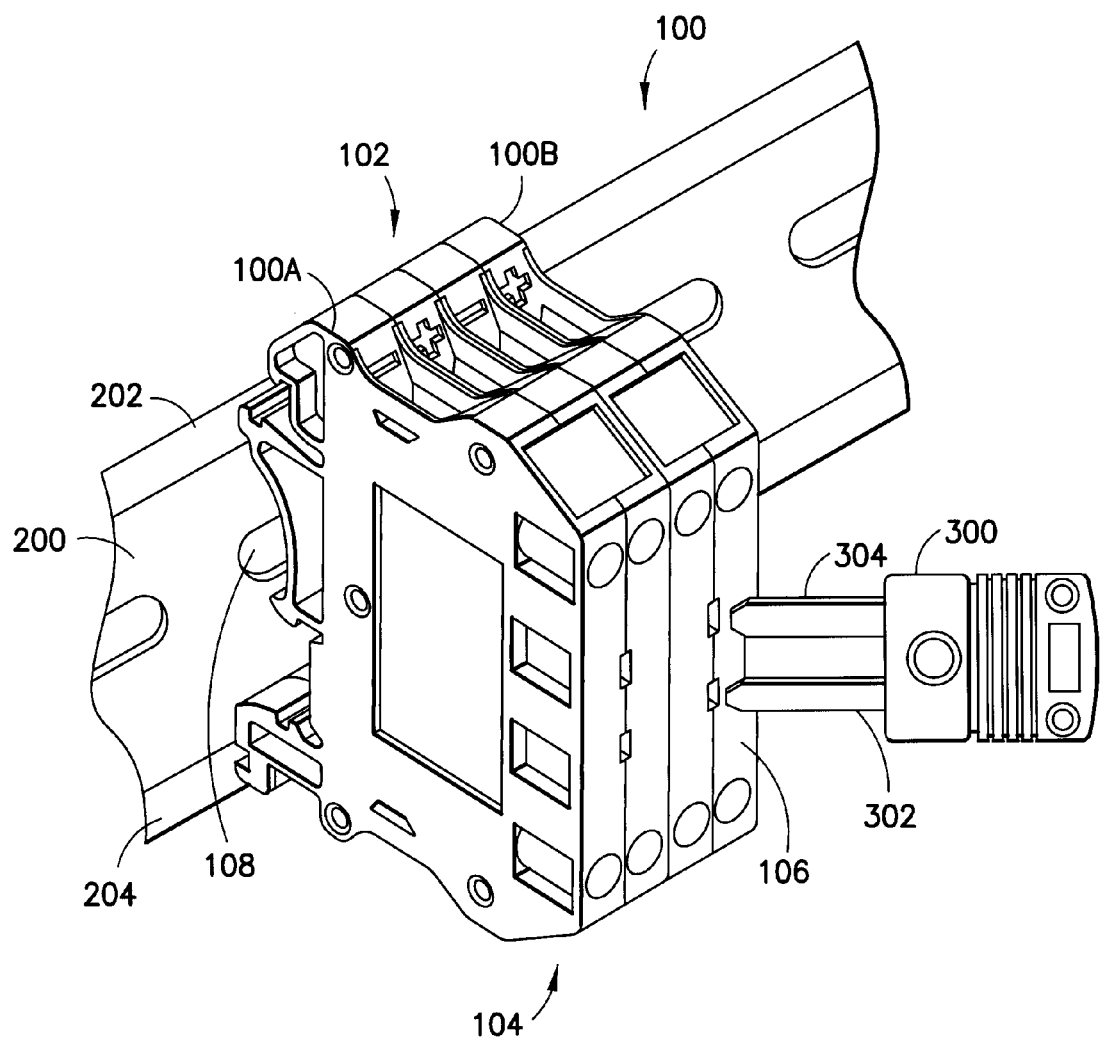
FIG. 1 illustrates a plurality of terminal blocks coupled to a rail according to some embodiments.

FIG. 1 illustrates an embodiment of a plurality of terminal blocks shown generally at 100 (e.g., two terminal blocks 100A and 100B are shown) that are each selectively coupled to each other and to a rail 200. Each of the plurality of terminal blocks 100 may receive a connector 300. In some embodiments, the rail 200 may comprise a DIN rail such as, but not limited to, a 35 mm×7.5 mm rail, a 15 mm×5.5 mm, a 7.5 mm wide top-hat rail, or a G-type rail. As illustrated, the rail 200 comprises an upper post 202 and a lower post 204 that receives portions of the terminal blocks 100 by means of, for example, a snap-on mounting as is known in the art.

As illustrated, the plurality of terminal blocks 100 comprises a first terminal block 100A coupled to a second terminal block 100B. While two terminal blocks 100A and 100B are illustrated, it should be appreciated that it is within the scope of the present invention for any number of terminal blocks to be coupled together. Each of the terminal blocks 100 comprises a first end 102, a second end 104, a top 106, and a bottom 108.

Figure 2:
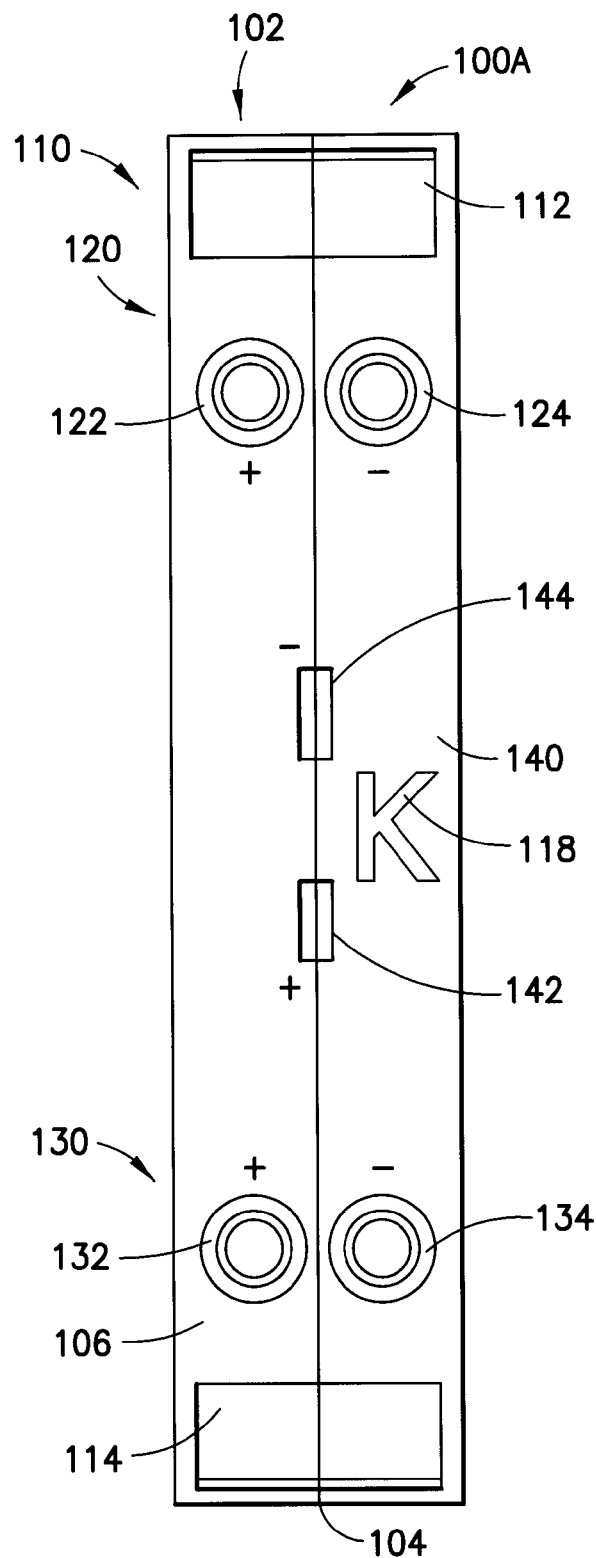
FIG. 2 illustrates a plan view of a terminal block according to some embodiments.
Figure 3:
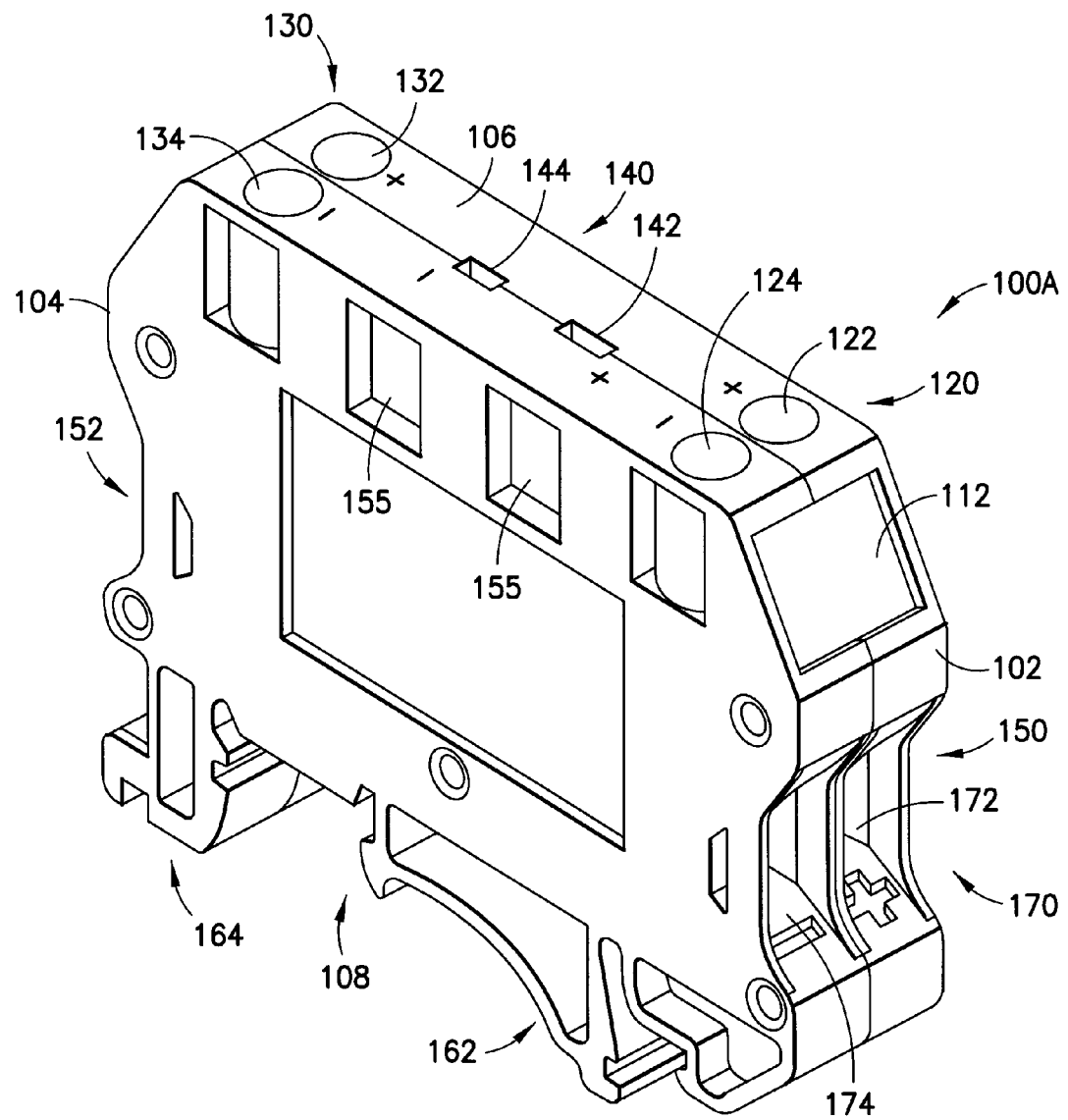
FIG. 3 illustrates an perspective view of a terminal block according to some embodiments.

Now referring to FIGS. 2 and 3, a plan view of one of the plurality of terminal blocks 100, namely, terminal block 100A, and a perspective view are illustrated, respectively, according to some embodiments. It should be appreciated that while features of the terminal block 100A are expressly described below it is within the scope of the present invention for two or more of the plurality of terminal blocks 100 to include these described features. The terminal block 100A comprises one or more indication windows 110 such as a first write-on identification window 112 and a second write-on identification window 114. Each write-on window 112 and 114 may comprise an indented or recessed area for presenting or holding indicia, for example, textual or graphic information, a label or other indicating means. The terminal block 100A further comprises a plurality of connection sockets such as, for example, one or more round pin connection sockets 120 and 130, one or more flat pin connection sockets 140, and one or more wire connection sockets 170. In one embodiment, the plurality of connection sockets 120, 130, 140, and 170 are comprised of a pair of sockets including a positive socket and a negative socket. For example, the round pin connection socket 120 includes a positive connection socket 122 and a negative connection socket 124. The round pin connection socket 130 includes a positive connection socket 132 and a negative connection socket 134. The flat pin connection socket 140 comprises a positive connection socket 142 and a negative connection socket 144. In one embodiment the flat pin connection socket 140 is a miniature type SMP thermocouple connector.

In one embodiment, the positive connection socket 122 is electrically coupled to the positive connection socket 132. As illustrated, the positive connection socket 122 is located at a top portion 106 of the terminal block 100 in proximity to the first end 102 and the positive terminal block connection socket 132 is located at the top portion 106 of the terminal block 100 in proximity to the second end 104. Furthermore, the positive connection socket 142 is electrically coupled to the positive connection socket 122 and to the positive connection socket 132. As shown in FIG. 1, the positive connection socket 142 may receive a first pin 302 of the connector 300. The positive connection sockets 122 and 132 may comprise any female connector, spring based connector, or screw based connector. In one embodiment, the connection sockets 142 and 144 are disposed substantially between the round pin connection socket 120 and the round pin connection socket 130.

Similarly, the negative connection socket 124 is electrically coupled to the negative connection socket 134. As illustrated, the negative connection socket 124 is located at the top 106 of the terminal block 100 in proximity to the first end 102 and the negative connection socket 134 is located at the top 106 in proximity to the second end 104 of the terminal block 100. Furthermore, the negative connection socket 144 is electrically coupled to the negative connection socket 124 and to the negative connection socket 134. As shown in FIG. 1, the negative connection socket 144 may receive a second pin 304 of the connector 300. The negative connection sockets 124 and 134 may comprise any female connector, spring based connector, or screw based connector.

In one embodiment, illustrated in FIGS. 1 and 2, the terminal block 100 comprises a visual indication 118 of a calibration type. In one embodiment, the calibration type is associated with the connection sockets 142 and 144. For example, the calibration type is associated with a type of alloy that comprises the connection sockets 142 and 144. In one embodiment, a calibration type of K may indicate that the positive connection socket 142 comprises CHROMEGA® material that comprises chromel and the negative connection socket 144 comprises ALOMEGA® material that comprises alumel. ALOMEGA and CHROMEGA are registered trademarks of Omega Engineering, Inc., Stamford, Conn. USA. In another embodiment, a calibration type of T may indicate that the positive connection socket 142 comprises copper and the negative connection socket 144 comprises constantan. In yet another embodiment, a calibration type of J may indicate that the positive connection socket 142 comprises iron and the negative connection socket 144 comprises constantan. In still other embodiments, a calibration type of E may indicate that the positive connection socket 142 comprises CHROMEGA® material and the negative connection socket 144 comprises constantan, a calibration type of N may indicate that the positive connection socket 142 comprises OMEGA-P® material and the negative connection socket 144 comprises OMEGA-N® material, a calibration type of U may indicate that the positive connection socket 142 comprises copper and the negative connection socket 144 comprises copper, a calibration type of R/S may indicate that the positive connection socket 142 comprises copper and the negative connection socket 144 comprises RNX/SNX. It should be appreciated that it is within the scope of the present invention to employ any combination of materials within sockets that would be beneficial for a given application.

Figure 4:
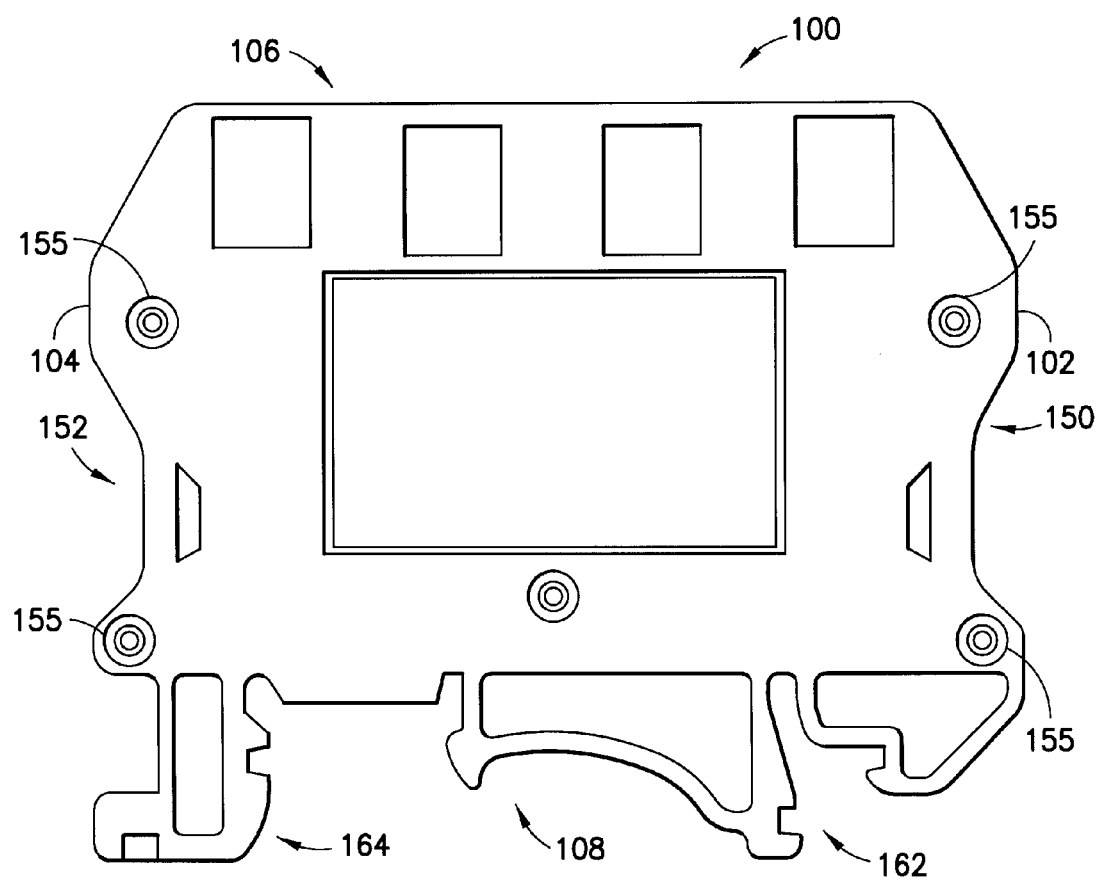
FIG. 4 illustrates a side view of a terminal block according to some embodiments.

FIGS. 3 and 4 illustrate a prospective view and a side view of one of the plurality of terminal blocks 100, for example, the terminal block 100A. According to some embodiments, the terminal block 100A comprises one or more recessed portions 150 and 152 to facilitate gripping of the first end 102 and the second end 104, respectively, of the terminal block 100A and to assists a user selectively couple and uncouple the terminal block 100A to and from the rail 200. As illustrated in FIGS. 1, 3 and 4, the terminal block 100A comprises an upper post rail mounting portion 162 to selectively couple the bottom side 108 of the terminal block 100A to the upper post 202 of the rail 200 and a lower post rail mounting portion 164 to selectively couple the bottom side 108 of the terminal block 100A to the lower post 204 of the rail 200.

In one embodiment, each of the terminal blocks 100 comprises one or more coupling means 155 to selective couple a plurality of the terminal blocks together, e.g., couple the first terminal block 100A to the second terminal block 100B, as shown in FIG. 1. In some embodiments, the coupling means 155 comprises a male extending portion on a first side of the terminal block 100A and a female receiving portion on a second side of the terminal block 100A. In this embodiment, the male extending portion of the terminal block 100A is received by a corresponding female receiving portion associated with the second terminal block 100B. In one embodiment, a fastener (not shown) may pass through the male and female portions to facilitate the selective coupling and uncoupling of two or more of the plurality of terminal blocks 100. In this embodiment, the female receiving portion may include internal threads or a threaded insert to receive the fastener.

Figure 5:
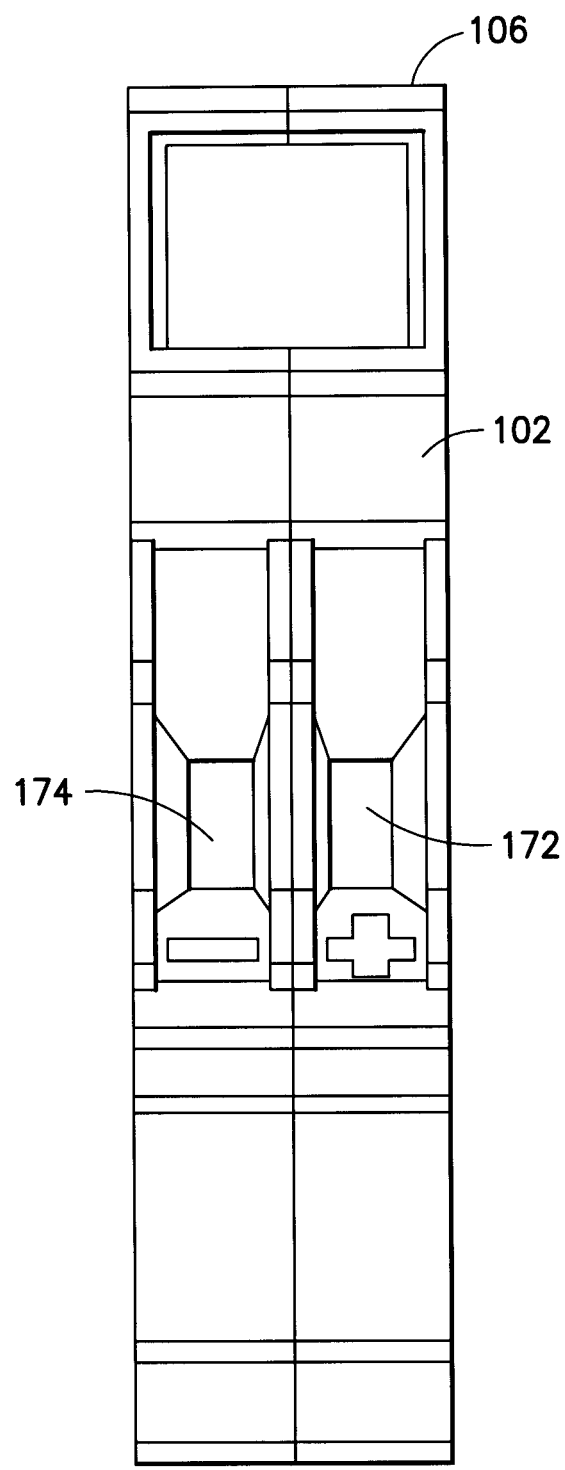
FIG. 5 illustrates an end view of a terminal block according to some embodiments.

An end view of the terminal block 100A is illustrated in FIG. 5, according to some embodiments. As shown, the terminal block 100A comprises a negative connection socket 174 and a positive connection socket 172. In some embodiments, the negative connection socket 174 and the positive connection socket 172 may comprise wire connection sockets that receive uninsulated portions of wires or leads. The negative connection socket 174 is coupled to the negative connection socket 124 and the positive connection socket 172 is coupled to the positive connection socket 122. Similarly, the end 104 (not shown) of the terminal block 100 may comprise a negative connection socket that is coupled to the negative connection socket 134 and a positive connection socket that is coupled to the positive connection socket 132. The positive connection sockets and the negative connection sockets of the ends 102 and 104 may comprise any female connector, spring based connector, or screw based connector. The positive connection sockets and the negative connection sockets of the ends 102 and 104 may receive an unshielded or non-insulated end of a wire.

Figure 6:
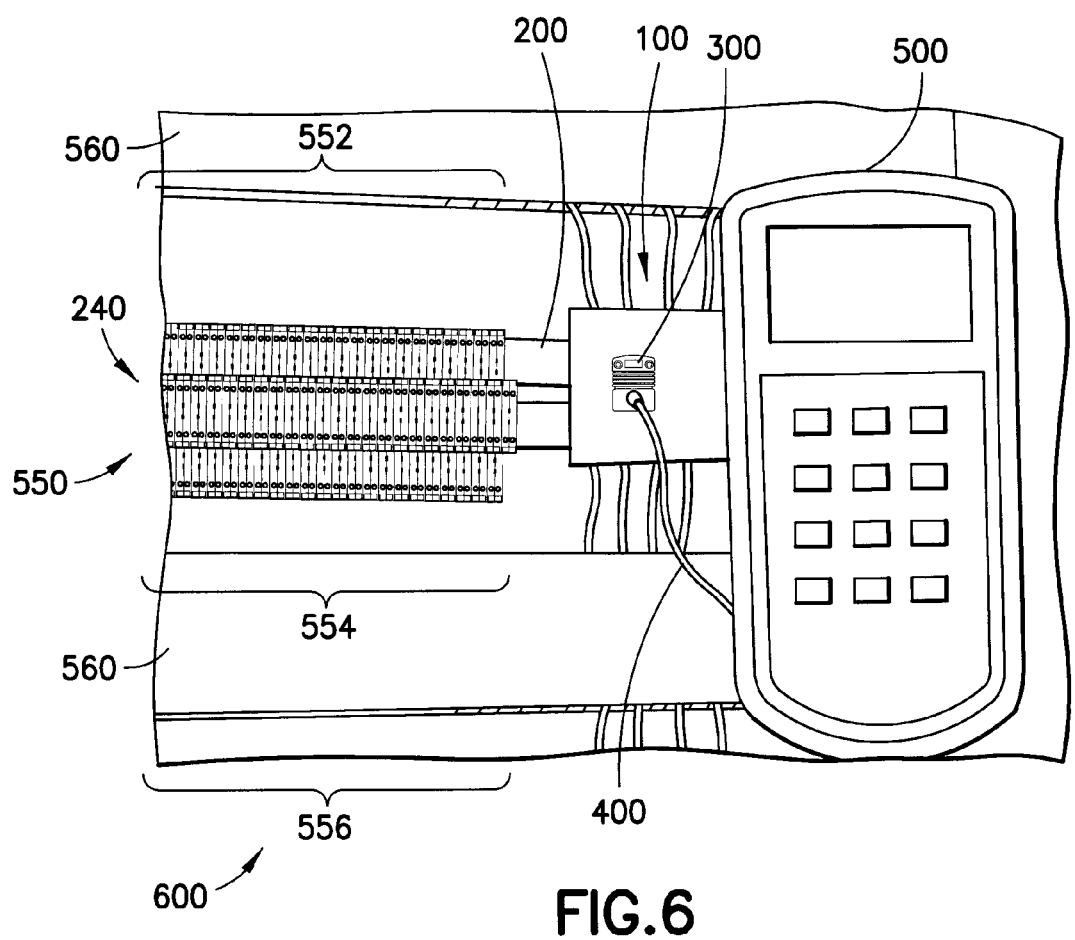
FIG. 6 illustrates a system according to some embodiments.

Now referring to FIG. 6, an embodiment of a system, shown generally at 600, is illustrated. The system 600 comprises one or more of the terminal blocks 100 coupled to the rail 200 at one or more control points 550, the connector 300, a meter 500 and a cable 400 coupling the connector 300 to the meter 500. As shown in FIG. 6, the control points 550 include a plurality of conventional terminal blocks 240 such as, for example, screw type terminal blocks sold by Omega Engineering, Inc. under the XB Series product or brand name. The terminal blocks 240 couple wires or leads 552, 554 and 556 interconnecting various components 560 of the system 600 for electrical, signal and/or data communication therebetween. The connector 300 may comprise, but is not limited to, an SMP type thermocouple connector comprising a flat 2-pin thermocouple connector. The flat 2-pin thermocouple connector facilitates connection of temperature sensor instrumentation, a temperature controller, a process control HMI automation panel, or the like measuring and sensing instrumentation to acquire data and/or information from the control points 550 of the system 600. In some embodiments, the connector 300 comprises male 2-pole thermocouple plugs, or round pin thermocouple connectors. The cable 400 may comprise, but is not limited to, an insulated copper wire. The meter 500, may comprise, but is not limited to, a handheld Thermocouple Datalogger/Thermometer that may be associated with a calibration type such as a Type K or Type T.

In some embodiments, one or more of the plurality of terminal blocks 100 may allow a user to selectively connect the meter 500 to measure, sense and/or collect data and information at various points or connections (e.g., the control points 550) within the system 600. With such measured, sensed and/or collected data and information personnel may conduct quality assurance compliance operations (e.g., perform auditing operations and testing) of control parameters of the system 600, monitor the system 600 and/or control points within the system 600 for capability studies and the like, trouble shoot installations of existing and/or new components coupled to the system 600, and/or test for a need for maintenance and repairs within the system 600. In some embodiments, the user may collect data and/or information by coupling the connector 300, and thus the meter 500, via the connection sockets 142 and 144 where the data and/or information is associated with any of the positive connection sockets 122, 132 and 172 or the negative connection sockets 124, 134 and 174.

As described herein, the improved terminal blocks 100 provide a number of perceived features and benefits over conventional terminal blocks. For example, in one embodiment, the terminal blocks 100 are manufactured with thermocouple alloys to provide accurate readings. Built-in features such as, for example, a built-in SMP compatible female receptacle accepts a miniature thermocouple connector. The female connector allows the user to connect to a handheld meter for applications such as data collection, quality assurance compliance, capability studies and troubleshooting installation or repairs. In one embodiment, a housing of the terminal block 100 is made from gray polyamide 6.6 thermoplastic resin with a UL 94 V0 rating for 85° C. These thermocouple terminal blocks are fully enclosed and require no end plates. The screws and clamps are zinc plated, and together they provide an excellent vibration, maintenance free and corrosion resistant connection.

Moreover, the improved terminal blocks 100 mount on standard hardware such as, for example, a 35 mm DIN rails or 32 mm G-type rails, and are identified with calibration type and positive (+) and negative (−) connections. Wire entry is funneled to allow quick wire insertion even with stranded wire. Other features include, for example, screw type terminals for secure and maintenance free connections, Type K, J, T, E, N, R/S and U Calibrations, the built-in miniature female thermocouple connector for auditing and troubleshooting, fully enclosed-no end plates required, DIN Rail mountable –narrow 10.7 mm width, identified with calibration and "+, −" connections, and write-on window included.

The several embodiments described herein are solely for the purpose of illustration. Persons in the art will recognize from this description that other embodiments may be practiced with modifications and alterations, limited only by the claims.

What is claimed is:

1. A terminal block selectively couplable to a rail, comprising:
   a first end, a second end, a top surface and a bottom surface;
   a first connection socket disposed in proximity to the first end of the terminal block;
   a second connection socket disposed in proximity to the second end of the terminal block; and
   a flat pin thermocouple connector coupled to the first connection socket and the second connection socket;
   wherein the first connection socket includes a matched pair of a positive connection socket and a negative connection socket, the second connection socket includes a matched pair of a positive connection socket and a negative connection socket, and the flat pin thermocouple connector includes a matched pair of a positive connection socket and a negative connection socket, and wherein the positive connection sockets of each of the first connection socket, the second connection socket and the flat pin thermocouple connector are interconnected and the negative connection sockets of each of the first connection socket, the second connection socket and the flat pin thermocouple connector are interconnected;
   wherein a visual indication of a calibration type associated with the flat pin thermocouple connector is disposed on the terminal block in proximity to the flat pin thermocouple connector;
   the terminal block further including:
      an upper post rail mounting portion configured to selectively receive an upper post of a rail; and
      a lower post rail mounting portion configured to selectively receive a lower post of the rail;
      wherein the first end and the second end of the terminal block each include at least one recess portion to assist in selectively coupling and uncoupling the terminal block to the rail.

2. A system of interconnected components, comprising:
   one or more first terminal blocks each having a first end, a second end, a top surface and a bottom surface, a first connection socket disposed in proximity to the first end, a second connection socket disposed in proximity to the second end, and a flat pin thermocouple connector interconnected to the first connection socket and the second connection socket by respective matched pairs of positive and negative connection sockets;
   a rail defining a plurality of control points, the one or more first terminal blocks selectively coupled to the rail on at least one of the plurality of control points;
   a plurality of second terminal blocks, distinct from the first terminal blocks, at least one of the plurality of second terminal blocks coupled to one of the plurality of control points of the rail;
   a plurality of components coupled to the second terminal blocks for electrical, signal and data communicating between the components; and
   a meter selectively coupled to the first terminal blocks, the meter measuring, sensing and collecting at least one of data and information associated with one or more of the plurality of components at one or more of the plurality of control points.

3. The system of claim 2, wherein the at least one of data and information associated with one or more of the plurality of components measured, sensed and collected by the meter provides for quality assurance compliance operations of the system.

4. The system of claim 3, wherein the quality assurance compliance operations, include auditing operations and testing of control parameters of the system.

5. The terminal block of claim 1, wherein the calibration type is associated with a type of alloy of the flat pin thermocouple connector.

6. The system of claim 2, wherein the at least one of data and information associated with one or more of the plurality of components measured, sensed and collected by the meter provides for capacity studies of the system.

7. The terminal block of claim 1, further comprising a write-on identification window.

8. The system of claim 2, wherein the at least one of data and information associated with one or more of the plurality of components measured, sensed and collected by the meter provides for troubleshooting operations of installation and repairs to at least one of existing and new components of the system.

9. The terminal block of claim 5, wherein the calibration type is comprised of a K type to indicate the type of alloy comprises chromel and alumel.

10. The terminal block of claim 5, wherein the calibration type is comprised of a T type to indicate the type of alloy comprises copper and constantan.

11. The terminal block of claim 5, wherein the calibration type is comprised of a J type to indicate the type of alloy comprises iron and constantan.

12. The terminal block of claim 5, wherein the calibration type is comprised of an E type to indicate the type of alloy comprises chromel and constantan.

13. The terminal block of claim 5, wherein the calibration type is comprised of a N type to indicate the type of alloy comprises nickel, chromium and silicon and nickel, chromium and magnesium.

14. The terminal block of claim 5, wherein the calibration type is comprised of a U type to indicate the type of alloy comprises copper.

15. The terminal block of claim 5, wherein the calibration type is comprised of a R type to indicate the type of alloy comprises platinum including thirteen percent rhodium.

16. The terminal block of claim 5, wherein the calibration type is comprised of a S type to indicate the type of alloy comprises platinum including ten percent rhodium.

17. The terminal block of claim 1, wherein at least one of the first connection socket and the second connection socket includes a spring based connector that receives and retains uninsulated portions of wires and leads comprised of thermocouple alloys.

18. The terminal block of claim 17 wherein the uninsulated portions of wires and leads are comprised of at least one of calibration K type, T type, J type, E type, N type, U type, R type and S type thermocouple alloys.

19. The terminal block of claim 1, wherein at least one of the first connection socket and the second connection socket includes a screw based connector that receives and retains uninsulated portions of wires and leads comprised of thermocouple alloys.

20. The terminal block of claim 19 wherein the uninsulated portions of wires and leads are comprised of at least one of calibration K type, T type, J type, E type, N type, U type, R type and S type thermocouple alloys.

* * * * *